(12) United States Patent
Tian

(10) Patent No.: US 11,863,005 B2
(45) Date of Patent: *Jan. 2, 2024

(54) POWER ELECTRONICS-BASED BATTERY MANAGEMENT

(71) Applicant: Clenera, LLC, Boise, ID (US)

(72) Inventor: Geng Tian, Phoenix, AZ (US)

(73) Assignee: Clenera, LLC, Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/723,088

(22) Filed: Apr. 18, 2022

(65) Prior Publication Data

US 2022/0239113 A1 Jul. 28, 2022

Related U.S. Application Data

(62) Division of application No. 17/159,291, filed on Jan. 27, 2021, now Pat. No. 11,322,966.

(51) Int. Cl.
H02J 7/00 (2006.01)

(52) U.S. Cl.
CPC ............ H02J 7/007 (2013.01); H02J 7/0014 (2013.01); H02J 7/00032 (2020.01); H02J 7/0047 (2013.01); H02J 7/0018 (2013.01); H02J 2207/20 (2020.01)

(58) Field of Classification Search
CPC ........ H02J 7/007; H02J 7/0014; H02J 7/0018; H02J 7/0047; H02J 7/00032; H02J 2207/20
USPC ....... 320/118, 121, 132, 134, 141, 153, 159, 320/164
See application file for complete search history.

(56) References Cited

U.S. PATENT DOCUMENTS

| | | | |
|---|---|---|---|
| 5,822,610 A | 10/1998 | Fung et al. | |
| 6,121,695 A | 9/2000 | Loh | |
| 9,168,836 B2 | 10/2015 | Jacobsen | |
| 9,331,497 B2 | 5/2016 | Beaston | |
| 9,847,654 B2 | 12/2017 | Beaston | |
| 9,882,401 B2 | 1/2018 | Beaston | |
| 9,923,247 B2 | 3/2018 | Beaston et al. | |
| 11,322,966 B1 * | 5/2022 | Tian ...................... | H02J 7/0047 |
| 11,509,155 B2 * | 11/2022 | Tian ...................... | H02J 7/0014 |

(Continued)

FOREIGN PATENT DOCUMENTS

| | | |
|---|---|---|
| EP | 2365620 A1 | 9/2011 |
| WO | WO-2019075294 A1 | 4/2019 |
| WO | WO-2022164689 A1 | 8/2022 |

OTHER PUBLICATIONS

ISA/US, International Search Report and Written Opinion dated Apr. 18, 2022, Int'l App. No. PCT/US2022/012891, 14 pages.

*Primary Examiner* — Edward Tso
*Assistant Examiner* — Aaron Piggush
(74) *Attorney, Agent, or Firm* — Holland & Hart LLP

(57) ABSTRACT

Methods, systems, and devices for power electronics-based (PE-based) battery management. A system may include a set of battery strings, where each battery string may include a set of battery modules, and where each battery module may include a set of battery cells. The system may also include a set of power converters, where each power converter may be coupled with at least one battery string. A power electronics-based (PE-based) BMS may provide one or more battery management functions for at least one corresponding battery string while also monitoring or controlling a corresponding power converter.

20 Claims, 8 Drawing Sheets

(56) References Cited

U.S. PATENT DOCUMENTS

| | | |
|---|---|---|
| 2005/0180236 A1 | 8/2005 | Thiele et al. |
| 2006/0043792 A1 | 3/2006 | Hjort et al. |
| 2006/0077697 A1 | 4/2006 | Yang |
| 2010/0121511 A1* | 5/2010 | Onnerud ................. B60L 58/15 320/134 |
| 2012/0105001 A1* | 5/2012 | Gallegos ............. H01M 10/441 320/109 |
| 2013/0278065 A1* | 10/2013 | Kawamoto ............... H02J 4/00 307/52 |
| 2014/0042815 A1* | 2/2014 | Maksimovic ........... H02J 1/102 307/63 |
| 2014/0152109 A1 | 6/2014 | Kanakasabai et al. |
| 2016/0114695 A1 | 4/2016 | Holgers et al. |
| 2016/0141894 A1 | 5/2016 | Beaston |
| 2019/0288532 A1* | 9/2019 | Mattos ................. H02J 7/0034 |
| 2019/0372361 A1 | 12/2019 | Fishman et al. |
| 2020/0052504 A1* | 2/2020 | Jeon ..................... H02J 7/0018 |
| 2020/0313445 A1 | 10/2020 | Slepchenkov et al. |
| 2021/0091577 A1* | 3/2021 | Nakao ...................... H02H 7/18 |
| 2021/0152009 A1* | 5/2021 | Hara ...................... H02J 7/0018 |
| 2021/0194076 A1 | 6/2021 | Wang et al. |
| 2022/0314837 A1* | 10/2022 | Gupta ............... H01M 10/6567 |

\* cited by examiner

POWER ELECTRONICS-BASED BATTERY MANAGEMENT

CROSS REFERENCE TO RELATED APPLICATIONS

This application is a divisional of U.S. patent application Ser. No. 17/159,291 by Tian, entitled "Power Electronics-Based Battery Management" and filed Jan. 27, 2021, which is assigned to the assignee hereof and incorporated by reference herein in its entirety.

FIELD OF TECHNOLOGY

The following relates to battery management, including power electronics-based battery management.

BACKGROUND

A battery energy storage system (BESS) may be used to store energy generated or otherwise delivered by a power source, such as a photovoltaic power plant as one example. A BESS may also be used to deliver power to a load, such as a utility grid as one example. In some cases, a BESS may include a large quantity of battery cells, which may be configured within a hierarchical system. For example, one or more battery cells may be included in a battery module, and a collection of battery modules may be referred to as a battery string (or alternatively as a rack in some cases, among other possibilities). In some cases, battery strings may themselves be organized into groups, and a group of battery strings may be referred to as a battery system (or alternatively as a battery block or battery box in some cases, among other possibilities).

A single BESS may include any quantity (e.g., one or more) of battery systems, and the one or more battery systems may be connected to a power source, a load, or both. An energy management system (EMS) may coordinate the acceptance of power by the BESS from the power source (e.g., a photovoltaic power plant or some other type of power plant, a utility grid), the delivery of power from the BESS to the load (e.g., a utility grid, one or more buildings), or both.

Improved methods, systems, and devices for battery management may be desired, including but not limited to within the context of a BESS.

SUMMARY

The described techniques relate to improved methods, systems, and devices for battery management, including power electronics-based (PE-based) battery management. A system may include a set of battery strings, which may generically refer to a collection of battery modules where each battery module may in turn include one or more battery cells. The system may also include a set of power converters, where each power converter may be coupled with at least one battery string. The power converter for a battery string may convert between a voltage input to or output by the voltage string and some other voltage. A PE-based battery management system (BMS) may provide one or more battery management functions for at least one corresponding battery string while also monitoring or controlling at least one corresponding power converter.

An apparatus is described. The apparatus may include a set of battery strings each configured to receive or output power at a first voltage, where each battery string of the set of battery strings includes a respective set of battery modules, and where each battery module of the respective set of battery modules includes a respective set of one or more battery cells. The apparatus may further include a set of power converters, where each power converter of the set of power converters may be coupled with at least one respective battery string of the set of battery strings, and each power converter of the set of power converters may be configured to convert between the first voltage and a second voltage that is different than the first voltage. The apparatus may further include a set of controllers, where each controller of the set of controllers may be configured to control a respective power converter of the set of power converters, and implement a set of battery management functions for the respective set of battery modules included in the respective battery string for the respective power converter.

In some examples of the apparatus, each controller of the set of controllers may be configured to control the respective power converter based at least in part on selectively activating or deactivating one or more switches of the respective power converter.

In some examples of the apparatus, each controller of the set of controllers may be configured to control the respective power converter based at least in part on monitoring one or more operating characteristics of the respective power converter.

In some examples of the apparatus, each power converter of the set of power converters may be coupled with each other power converter of the set of power converters.

In some examples of the apparatus, the first voltage may be a direct current (DC) voltage and the second voltage may be an alternating current (AC) voltage.

Some examples of the apparatus may further include a transformer, where one or more power converters of the set of power converters are coupled with the transformer.

In some examples of the apparatus, the first voltage may be a first DC voltage and the second voltage may be a second DC voltage.

Some examples of the apparatus may further include an additional power converter configured to convert between the second voltage and an AC voltage, where one or more power converters of the set of power converters may be coupled with the additional power converter, and a transformer, where the additional power converter may be coupled with the transformer.

In some examples of the apparatus, at least a subset of the battery modules of the respective set of battery modules are interconnected in series.

Some examples of the apparatus may further include an energy management system configured to coordinate energy exchange between the set of battery strings and a utility grid, where each controller of the set of controllers may be further configured to communicate status information for the respective battery string with the energy management system.

In some examples of the apparatus, each battery module of the respective set of battery modules may include a respective module controller configured to implement a set of module-level battery management functions for the respective set of one or more battery cells included in the battery module, and a controller of the set of controllers may be configured to implement the set of battery management functions for the set of battery modules included in the respective battery string based at least in part on exchanging signaling with the respective module controller of each battery module included in the respective battery string.

An apparatus is described. The apparatus may include a set of battery modules, where the set of battery modules is configured to receive or output power at a first voltage. The apparatus may further include a power converter coupled with the set of battery modules and configured to convert between the first voltage and a second voltage different than the first voltage, wherein the power converter comprises one or more switches. The apparatus may further include a controller configured to control the one or more switches of the power converter, and implement a set of battery management functions for the set of battery modules.

In some examples of the apparatus, to control the one or more switches of the power converter, the controller may be configured to control a duty cycle of the one or more switches, operate the one or more switches according to a pulse-width modulation algorithm, or any combination thereof.

In some examples of the apparatus, the controller may be further configured to control one or more components configured to provide current protection, voltage protection, or both for the set of battery modules.

In some examples of the apparatus, the controller may be further configured to control one or more components configured to selectively isolate the set of battery modules from a second set of battery modules.

In some examples of the apparatus, the set of battery modules may be a string of battery modules that are interconnected in series.

In some examples, to implement the set of battery management functions for the set of battery modules, the controller may be configured to monitor a voltage output by each battery module of the set of battery modules, monitor a current output by each battery module of the set of battery modules, monitor an extent of charge for each battery module of the set of battery modules, monitor a capacity of each battery module of the set of battery modules, monitor a temperature of the set of battery modules, balance respective voltages, respective currents, or any combination thereof across a plurality of battery modules within the set of battery modules, selectively enable or disable a battery module of the set of battery modules, or any combination thereof.

In some examples of the apparatus, the controller may be implemented on a single semiconductor die.

In some examples of the apparatus, the controller may be implemented on a plurality of semiconductor dies.

In some examples of the apparatus, each battery module of the set of battery modules may further include a respective set of one or more battery cells configured to collectively operate at a third voltage different than the first voltage, and a respective module controller configured to implement a set of module level battery management functions for the respective set of one or more battery cells.

In some examples of the apparatus, the controller may be configured to exchange signaling with the respective module controller for each battery module of the set of battery modules.

In some examples of the apparatus, the respective set of one or more battery cells may include a first plurality of battery cells that are interconnected in series and a second plurality of battery cells that are interconnected in parallel.

In some examples of the apparatus, to implement the set of module-level battery management functions for the respective set of one or more battery cells, the respective module controller may be configured to monitor a voltage output by each battery cell of the respective set of one or more battery cells, monitor a current output by each battery cell of the respective set of one or more battery cells, monitor an extent of charge for each battery cell of the respective set of one or more battery cells, monitor a capacity of each battery cell of the respective set of one or more battery cells, monitor a temperature of the respective set of one or more battery cells, balance respective voltages, respective currents, or any combination thereof across a plurality of battery cells within the respective set of one or more battery cells, selectively enable or disable a battery cell of the respective set of one or more battery cells, or any combination thereof.

A method is described. The method may include controlling a power converter configured to convert between a first voltage and a second voltage different than the first voltage. The method may further include exchanging signaling with each battery module of a set of battery modules, where the set of battery modules is configured to receive power from or output power to the power converter at the first voltage. The method may further include implementing a set of battery management functions for the set of battery modules based at least in part on exchanging the signaling with each battery module of the set of battery modules.

An apparatus is described. The apparatus may include a controller, and the controller may be configured to control a power converter, the power converter configured to convert between a first voltage and a second voltage different than the first voltage. The controller may be further configured to exchange signaling with each battery module of a set of battery modules, where the set of battery modules is configured to receive power from or output power to the power converter at the first voltage. The controller may be further configured to implement a set of battery management functions for the set of battery modules based at least in part on exchanging the signaling with each battery module of the set of battery modules. In some examples, the apparatus may further include memory in electronic communication with the controller, and instructions stored in the memory. The instructions may be executable by the controller to cause the controller to perform one or more functions ascribed to the controller herein.

Another apparatus is described. The apparatus may include means for controlling a power converter configured to convert between a first voltage and a second voltage different than the first voltage, means for exchanging signaling with each battery module of a set of battery modules, where the set of battery modules is configured to receive power from or output power to the power converter at the first voltage, and means for implementing a set of battery management functions for the set of battery modules based at least in part on exchanging the signaling with each battery module of the set of battery modules.

A non-transitory computer-readable medium storing code is described. The code may include instructions executable by a controller to control a power converter, the power converter configured to convert between a first voltage and a second voltage different than the first voltage. The instructions may be further executable by the controller to exchange signaling with each battery module of a set of battery modules, where the set of battery modules is configured to receive power from or output power to the power converter at the first voltage, and implement a set of battery management functions for the set of battery modules based at least in part on exchanging the signaling with each battery module of the set of battery modules.

In some examples of the method, apparatuses, and non-transitory computer-readable media, operations, features, means, or instructions for controlling the power converter may include operations, features, means, or instructions for selectively activating one or more switches of the power converter.

In some examples of the method, apparatuses, and non-transitory computer-readable media, based on selectively activating and deactivating at least one switch of the one or more switches of the power converter, the controller may be configured to control a duty cycle of the at least one switch or a duty cycle of the at least one switch may be otherwise controlled.

In some examples of the method, apparatuses, and non-transitory computer-readable media, based on selectively activating and deactivating at least one switch of the one or more switches of the power converter, the controller may be configured to operate the at least one switch according to a pulse-width modulation algorithm or the at least one switch may be otherwise operated according to the pulse-width modulation algorithm.

Some examples of the method, apparatuses, and non-transitory computer-readable media may further include operations, features, means, or instructions for receiving signaling indicating a magnitude of an input current for the power converter, signaling indicating a magnitude of an output current for the power converter, or both, and controlling the power converter based at least in part on the receiving the signaling indicating the magnitude of the input current for the power converter, the signaling indicating the magnitude of the output current for the power converter, or both.

Some examples of the method, apparatuses, and non-transitory computer-readable media may further include operations, features, means, or instructions for receiving signaling indicating a magnitude of an input voltage for the power converter, signaling indicating a magnitude of an output voltage for the power converter, or both, and controlling the power converter based at least in part on the receiving the signaling indicating the magnitude of the input voltage for the power converter, the signaling indicating the magnitude of the output voltage for the power converter, or both.

Some examples of the method, apparatuses, and non-transitory computer-readable media may further include operations, features, means, or instructions for selectively activating and deactivating a first switch configured to selectively couple a first node of the power converter with the set of battery modules, and selectively activating and deactivating a second switch configured to selectively couple a second node the power converter with a load or power source.

Some examples of the method, apparatuses, and non-transitory computer-readable media may further include operations, features, means, or instructions for controlling a contactor configured to selectively couple a first node of the power converter with the set of battery modules.

Some examples of the method, apparatuses, and non-transitory computer-readable media may further include operations, features, means, or instructions for controlling a conditioning circuit to precharge an input voltage the power converter, an output voltage of the power converter, or both, coupling a first node of the power converter with the set of battery modules after precharging the input voltage the power converter, the output voltage of the power converter, or both, and coupling a second node of the power converter with a load or power source after precharging the input voltage the power converter, the output voltage of the power converter, or both.

Some examples of the method, apparatuses, and non-transitory computer-readable media may further include operations, features, means, or instructions for monitoring one or more operating characteristics of the power converter, and controlling the power converter based on the monitoring.

In some examples of the method, apparatuses, and non-transitory computer-readable media, operations, features, means, or instructions for implementing the set of battery management functions for the set of battery modules may include operations, features, means, or instructions for monitoring a voltage output by each battery module of the set of battery modules, monitoring a current output by each battery module of the set of battery modules, monitoring an extent of charge for each battery module of the set of battery modules, monitoring a capacity of each battery module of the set of battery modules, monitoring a temperature of the set of battery modules, balancing respective voltages, respective currents, or any combination thereof across a plurality of battery modules within the set of battery modules, selectively enabling or disabling a battery module of the set of battery modules, or any combination thereof.

Some examples of the method, apparatuses, and non-transitory computer-readable media may further include operations, features, means, or instructions for communicating status information for the set of battery modules with an energy management system and controlling the power converter and the set of battery modules based at least in part on signaling received from the energy management system.

In some examples of the method, apparatuses, and non-transitory computer-readable media, the controller may be implemented on a single semiconductor die.

In some examples of the method, apparatuses, and non-transitory computer-readable media, the controller may be implemented on a plurality of semiconductor dies.

DETAILED DESCRIPTION

Figure 1:
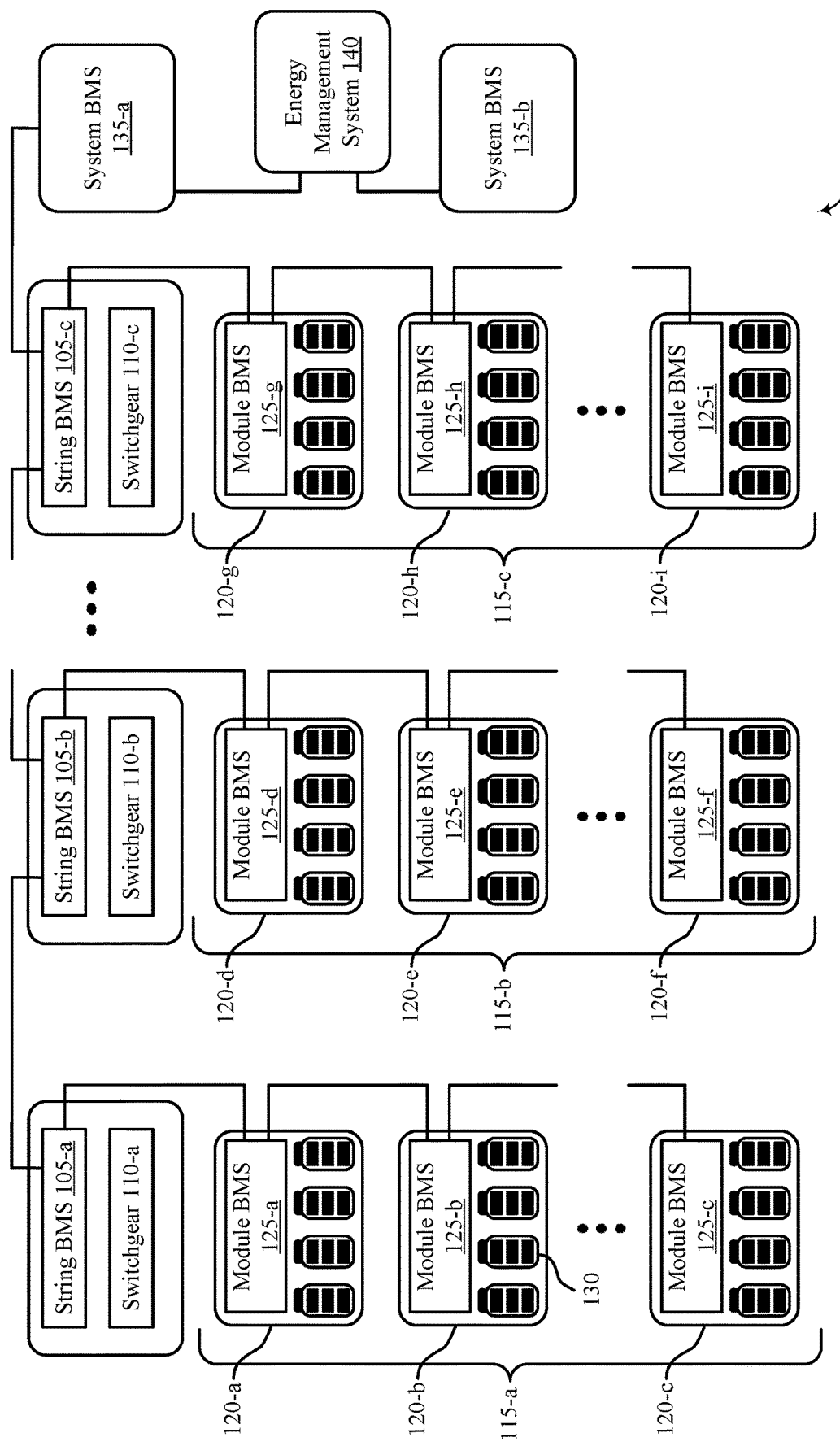
FIG. 1 illustrates an example of aspects of a battery energy storage system in accordance with aspects of the present disclosure.

A battery energy storage system (BESS) may include a hierarchical collection of battery cells and may be used to store energy, for example, generated by an associated power plant. For example, a BESS may be used to store energy generated by a photovoltaic power plant (e.g., a so-called "solar farm"), so that such energy may be delivered to a power grid or other load on an as-needed or otherwise as-desired basis.

A BESS may include any quantity of battery systems, where a battery system may refer to a collection of battery strings. A battery system may alternatively be referred to as a battery block or battery box, among other possibilities. A battery string may in turn refer to a collection of interconnected battery modules. The battery modules within a battery string may be interconnected in series, but a battery string as described herein may broadly refer to any collection of interconnected battery modules (e.g., battery modules of a battery string may additionally or alternatively be interconnected in parallel). A battery string may alternatively be referred to as a battery rack, among other possibilities. In some cases, battery strings within a battery system may be interconnected with one another in parallel (e.g., each battery string may have a respective input or output node, and for the battery strings of a battery system, such nodes may be coupled with one another). A battery module may in turn refer to a collection of one or more interconnected battery cells, where each battery cell may be configured to store a respective portion of the energy stored by the BESS. A battery cell may alternatively be referred to as a battery, among other possibilities. Battery cells within a battery module may be interconnected in series, in parallel, or in any combination thereof.

In some systems, battery management functions may be implemented at different hierarchical levels according to the overall BESS architecture. A component or collection of components configured to implement battery management functions may be referred to as a battery management system (BMS), and a BMS may provide battery management functions for a corresponding storage entity (e.g., a corresponding battery module, a corresponding battery string, or a corresponding battery system). For example, within a BESS, some BMSs may operate at the module level (e.g., Level 1) and be referred to as module BMSs, some BMSs may operate at the string level (e.g., Level 2) and be referred to as string BMSs, and some BMSs may operate at the system level (e.g., Level 3) and be referred to as system BMSs. As described elsewhere herein, in general, a BMS may monitor and control aspects of the corresponding storage entity to support desired operation of the corresponding storage entity. As one such example, a module BMS may ensure that battery cells within the battery module are balanced (e.g., equal or nearly equal) in terms of voltage, current, and capacity levels, such as by charging undercharged battery cells while bypassing overcharged battery cells or by withdrawing from overcharged battery cells while bypassing undercharged battery cells). A BMS thus may measure, monitor, or control various operational aspects (e.g., voltages, currents, states of charge, states of health, temperatures, or the like) for the corresponding storage entity.

A BMS at one level of the hierarchy may communicate with and in some cases at least partially manage or be managed by a BMS at another level of the hierarchy. For example, each module BMS may communicate with a string BMS for the battery string that includes the corresponding battery module. In some systems, each string BMS may in turn communicate with a system BMS for the battery system that includes the battery string. Further, in some systems, each system BMS may in turn communicate with an energy management system (EMS), which may coordinate the acceptance of power by the BESS from a power plant (e.g., a photovoltaic power plant) or the delivery of power from the BESS to a power grid (e.g., a utility grid) or other load.

A BESS may also include any quantity of circuit protection devices (e.g., fuses, circuit breakers, current transducers, or the like) to provide circuit protection for the components of the BESS. In some systems, circuit protection and one or more other aspects related to electrical operation of the BESS, such as power conversion between different aspects of the BESS that may operate at different voltage levels, may be divorced (e.g., operate independently of, without intercommunication or information exchange) from battery manage aspects of the BESS. For example, a BMS may not monitor or have any awareness of one or more other aspects of BESS operation, such as circuit protection or power conversion functionalities.

As described herein, however, one or more power electronics-based (PE-based) BMSs may be introduced into a BESS, which may provide improved efficiency, eliminate or otherwise reduce a quantity of redundant components, or reduced complexity, among other benefits as may be appreciated by one of ordinary skill in the art. For example, a PE-based BMS may be introduced for each battery string (or for pairs of battery strings, as another example) and may provide string-level (e.g., Level-2) BMS functions for the at least one corresponding battery string. A power converter may also be introduced for each battery string (or for pairs of battery strings, as another example) and may convert between a string voltage (e.g., a voltage at which a battery string operates) and some other voltage at which another aspect of the BESS is configured to operate. Such a power converter may be, for example, a direct current (DC) to DC converter or a DC to alternating current (AC) converter. Along with providing one or more battery management functions (e.g., for a battery string), a PE-based BMS as may control or monitor one or more aspects of power converter operation (e.g., for a power converter for the battery string). Further, as a power converter may include various circuit protection components or capabilities, introduction of power converters at the string level within a BESS may allow the elimination of one or more other circuit protection components. Additionally or alternatively, a PE-based BMS as described herein may provide one or more BMS functions conventionally performed by a system BMS and may support the elimination of system BMSs.

A PE-based BMS may include, for example, one or more controllers that implement BMS functionalities as described herein and also control a corresponding power converter, or one or more controllers that implement BMS functionalities and communicate or otherwise coordinate with one or more other controllers that control a corresponding power converter and thereby monitor the corresponding power converter. As used herein, a controller may refer to a processor, a microprocessor, a microcontroller, a central processing unit (CPU), application-specific integrated circuit (ASIC), digital signal processor (DSP), field-programmable gate array (FPGA) or other programmable logic device, discrete gate or transistor logic, discrete hardware components, any collection or combination thereof, or any other circuitry designed to perform the functions ascribed herein to a controller. Additionally or alternatively, a PE-based BMS may include any firmware, software, or algorithm that may be executable (e.g., by one or more controllers) to perform the functions ascribed herein to a PE-based BMS.

Aspects of the disclosure are initially described in the context of battery energy storage systems. Aspects of the disclosure are then further described with respect to apparatus diagrams, system diagrams, and flowcharts that relate to PE-based BMSs.

FIG. 1 illustrates an example of a BESS 100 in accordance with aspects of the present disclosure. The BESS 100 may include any quantity of battery cells 130, battery modules 120, and battery strings 115, which may be collected into one or more battery systems, along with corresponding module BMSs 125, string BMSs 105, and system BMSs 135. A BESS 100 may further include an EMS 140.

Each battery cell 130 may be configured to store energy and may be configured to operate at a corresponding voltage, which may be referred to as a cell voltage.

Each battery module 120 may include one or more battery cells 130. The battery cells 130 within a battery module 120 may be interconnected in series, parallel, or any combination thereof. Collectively, the battery cells 130 within a battery module 120 may operate at a voltage that may be referred to as a module voltage, which be the same as or different than the cell voltage. For example, if some quantity of the battery cells 130 within the battery module 120 are interconnected in series, the module voltage may be greater than the cell voltage.

A battery module 120 may include or otherwise be coupled with a corresponding module BMS 125, which may provide various battery management functions for the battery module 120 (e.g., to control and monitor the battery cells 130 of the battery module 120). For example, a battery module 120 may include or be coupled with one or more sensors, and a module BMS 125 may receive and monitor information provided by such sensors (e.g., voltage, current, state of charge, capacity, headroom, state of health, or temperature information for the battery cells 130 of the battery module 120). As another example, a module BMS 125 may manage the battery module 120 to balance (e.g., align, maintain as equal or nearly equal) the battery cells 130 within the battery module 120 with respect to voltage, current, capacity, charge (e.g., state of charge), headroom levels, among other possible metrics. As another example, a module BMS 125 may provide circuit protection or other forms of protection for the battery cells 130 within the battery module 120. For instance, a battery module 120 may include one or more switches (e.g., transistors), and a module BMS 125 may control the operation of such switches to charge one or more undercharged battery cells 130 while bypassing one or more overcharged battery cells 130 or discharge one or more overcharged battery cells 130 while bypassing one or more undercharged battery cells 130, or to disable or isolate one or more defective or at-risk (e.g., overheated) battery cells 130, among other possibilities. Battery management functions provided by a module BMS 125 may in some cases be referred to as Level 1 battery management functions. A module BMS 125 may include a controller to implement or manage the functionalities ascribed herein to a module BMS 125.

Each battery string 115 may include some quantity of battery modules 120. The battery modules 120 within a battery string 115 may be interconnected in series, parallel, or any combination thereof. Collectively, the battery modules 120 within a battery string 115 may operate at a voltage that may be referred to as a string voltage, which be the same as or different than the module voltage. For example, in cases where some quantity of the battery modules 120 within the battery string 115 are interconnected in series, the string voltage may be greater than the module voltage.

A battery string 115 may include or otherwise be coupled with a corresponding string BMS 105, which may provide various battery management functions for the battery string 115 (e.g., to control and monitor the battery modules 120 of the battery string 115). For example, a string BMS 105 may provide like functionalities as described herein for a module BMS 125, but with respect to the battery modules 120 of a battery string 115 rather than the battery cells 130 of a battery module 120. Further, a string BMS 105 for a battery string 115 may communicate with (e.g., exchange information with) each module BMS 125 for the battery string 115. For example, a string BMS 105 may receive information from a module BMS 125 such as status information for the corresponding battery module 120 (e.g., data regarding a voltage, current, charge, capacity, temperature or the like for the battery module 120). Battery management functions provided by a string BMS 105 may in some cases be referred to as Level 2 battery management functions. A module BMS 125 may include a controller to implement or manage the functionalities ascribed herein to a module BMS 125.

In some cases, a BESS 100 may further include a respective switchgear 110 for each battery string 115. A switchgear 110 may provide an electrical interface for the corresponding battery string 115 (e.g., to support coupling of the battery string 115 with one or more other components) along with one or more circuit protection functions for the corresponding battery string 115. For example, a switchgear 110 may include any quantity of fuses, circuit breakers, current transducers, current sensors or other circuit protection circuitry. In some cases, a switchgear 110 may monitor a string voltage for a battery string 115, or the current to or from the battery string 115, or both and may isolate the battery string 115 (e.g., disconnect the battery string 115 from other aspects of the BESS 100) if the voltage or current is excessive or for some other reason (e.g., maintenance). In some cases, a switchgear 110 for a battery string 115 may include the string BMS 105 for the battery string 115.

A collection of battery strings 115 may in some cases be referred to as a battery system, or alternatively as a battery block or battery box, among other possibilities. For example, battery strings 115-a, 115-b, and 115-c—possibly along with any quantity of additional battery strings 115—may be included in a same battery box. In some cases, a battery system may correspond to (e.g., include or be included in) an enclosure that includes the battery strings 115 of the battery system. The enclosure may be, for example, a building, a container, or any other type of enclosure.

A battery system may include or otherwise be coupled with a corresponding system BMS 135, which may provide various battery management functions for the battery system (e.g., to control and monitor the battery strings 115 of the battery system). For example, a string BMS 105 may provide like functionalities as described herein for a module BMS 125, but with respect to the battery strings 115 of a battery system rather than the battery cells 130 of a battery module 120. For example, a system BMS 135 may manage the battery system to balance (e.g., align, maintain as equal or nearly equal) the battery strings 115 within the battery module 120 with respect to voltage, current, capacity, charge (e.g., state of charge), headroom levels, among other possible metrics. As another example, a system BMS 135 may control the operation of the switchgears 110 or other switching components within the battery system to isolate any defective or deactivated battery string 115. Further, a system BMS 135 for a battery system may communicate with (e.g., exchange information with) each string BMS 105 for the battery system. For example, a system BMS 135 may receive information from a string BMS 105 such as status information for the corresponding battery string 115 (e.g., data regarding a voltage, current, charge, capacity, temperature or the like for the battery string 115). A system BMS 135 may also receive information from module BMSs 125 within the battery system (e.g., as relayed to the system BMS 135 by the string BMSs 105), such as status information for the corresponding battery modules 120. Battery management functions provided by a system BMS 135 may in some cases be referred to as Level 3 battery management functions. A system BMS 135 may include a controller to implement or manage the functionalities ascribed herein to a system BMS 135.

A BESS 100 may include any quantity of battery systems, and thus any quantity of system BMSs 135. Each system BMS 135 within the BESS may communicate with the EMS 140. The EMS may coordinate the acceptance of power by the BESS from a power plant (e.g., a photovoltaic power plant) or the delivery of power from the BESS to a power grid (e.g., a utility grid) or other load. In some cases, a BESS 100 may include a central power converter (not shown), such as a DC-to-DC or DC-to-AC converter for example, to convert between a voltage output by one or more battery systems (e.g., the string voltage of the battery strings 115 within the battery system) and a voltage of the power grid or other load, or to convert between a voltage output by the power plant and a voltage input to the one or more battery systems (e.g., the string voltage of the battery strings 115 within the battery system).

Figure 2:
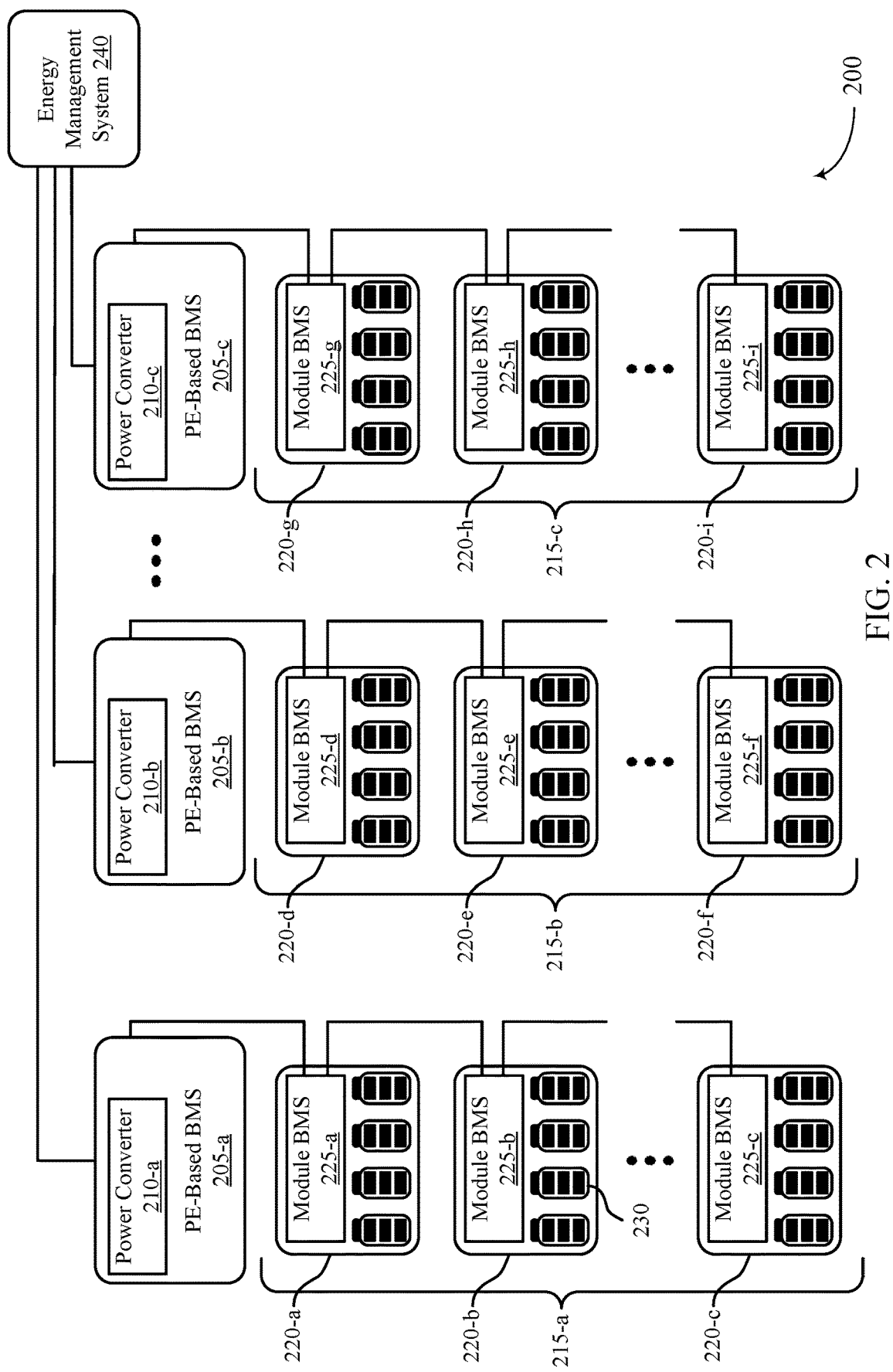
FIG. 2 illustrates an example of aspects of a battery energy storage system in accordance with aspects of the present disclosure.

FIG. 2 illustrates an example of a BESS 200 in accordance with aspects of the present disclosure. The BESS 200 may include any quantity of battery cells 230 and battery modules 220, along with corresponding module BMSs 225, which may be examples of battery cells 130, battery modules 120, and module BMSs 125 as described herein.

Battery modules 220 may be grouped into battery strings 215. Each battery string 215 may include some quantity of battery modules 220, which may be interconnected in series, parallel, or any combination thereof. Collectively, the battery modules 220 within a battery string 215 may operate at a voltage that may be referred to as a module voltage, which be the same as or different than the cell voltage of the battery cells 230. For example, in cases where some quantity of the battery modules 220 within the battery string 215 are interconnected in series, the string voltage may be greater than the module voltage.

Each battery string 215 may include or otherwise be coupled with both a respective power converter 210 and a corresponding PE-based BMS 205. The power converter 210 may include various power electronics circuitry (e.g., one or more power switches such as power metal-oxide-semiconductor field-effect transistors (MOSFETs) or other types of switches such as other types of transistors, one or more capacitors, one or more inductors) and may be configured to convert between the string voltage of the corresponding battery string 215 and some other voltage. The other voltage may have a magnitude that is the same as, lower than, or higher than the string voltage. The string voltage may be a DC voltage, and the other voltage may be either a DC or an AC voltage—that is, the power converter 210 may be a DC-to-DC converter or a DC-to-AC converter (e.g., an inverter). In some cases, the power converter 210 may be a switch-mode power converter and may operate one or more switching components according to one or more duty cycles, in accordance with a pulse-width modulation algorithm, or any combination thereof in order to covert between the string voltage and the other voltage. The power converter 210 may also be a bidirectional power converter, and currently be able to flow into or out of the battery string 215 through the power converter 210.

The power converter 210 may also include one or more electronic (e.g., overcurrent or overvoltage) protection components, such as circuit breakers, current transducers, isolation switches, fuses, or the like. Additionally or alternatively, in some cases, one or more aspects of the power electronics circuitry within the power converter 210 may be operable to provide a power conversion function along with an circuit protection function. For example, one or more switches (e.g., power switches) within the power converter 210 may be operable to isolate the corresponding battery string 215 from other aspects of the BESS 200. Accordingly, the BESS 200 may not include any switchgears 110 as described with reference to FIG. 1, which may reduce a presence of redundant components, reduce complexity of the BESS 200, or improve the efficiency of the BESS 200, among other possible benefits that may be appreciated by one of ordinary skill in the art.

The PE-Based BMS 205 for a battery string 215 may implement one or more battery management functions for the battery string 215 (e.g., to control and monitor the battery modules 220 of the battery string 215). For example, the PE-Based BMS 205 may implement any one or more Level 2 (e.g., string level) battery management functions described elsewhere herein (e.g., any functions ascribed herein to a string BMS 105 as descried with reference to FIG. 1). Additionally, in some cases the PE-Based BMS 205 may implement any one or more Level 3 (e.g., system level) battery management functions described elsewhere herein (e.g., any functions ascribed herein to a system BMS 135 as descried with reference to FIG. 1). Accordingly, the BESS 200 may not include any system BMSs 135 as described with reference to FIG. 1. Thus, BESS 200 may have a two-tier hierarchy with respect to battery management, as opposed to, for example, a three-tier hierarch as described with reference to FIG. 1, which may reduce a presence of redundant components, reduce complexity of the BESS 200, or improve the efficiency of the BESS 200, among other possible benefits that may be appreciated by one of ordinary skill in the art.

For example, a PE-based BMS 205 may communicate with each module BMS 225 within the corresponding battery string 215 as well as an energy management system 240 (which may be an example of an energy management system 140 as described with reference to FIG. 1). For example, a battery string 215 or the battery modules 220 therein may include or be coupled with one or more sensors, and a PE-Based BMS 205 may receive and monitor information provided by such sensors (e.g., voltage, current, state of charge, capacity, headroom, state of health, or temperature information for the battery modules 220 or the battery cells 230 therein). Additionally or alternatively, a PE-Based BMS 205 may receive and monitor information provided by such sensors for the battery string 215 as a whole (e.g., voltage, current, state of charge, capacity, headroom, state of health, or temperature information for the battery string 215). In some cases, a PE-Based BMS 205 may transmit one or more aspects of string-level, module-level, or cell-level information (e.g., status information) as described herein to the EMS 240. A PE-Based BMS 205 may receive information (e.g., control signals) from the EMS 240 (e.g., requests for status information or other aspects of string-level, module-level, or cell-level information as described herein) and transmit information or commands to the module BMSs 225 of the corresponding battery string 215.

A PE-based BMS 205 may manage the battery string 215 to balance (e.g., align, maintain as equal or nearly equal) the battery modules 220 within the battery string 215 with respect to voltage, current, capacity, charge (e.g., state of charge), headroom levels, among other possible metrics. Additionally or alternatively, a PE-based BMS 205 may provide circuit protection or other forms of protection for the battery modules 220 within the battery string 215. For instance, a battery string 215 or battery modules 220 therein may include one or more switches (e.g., transistors), and a PE-based BMS 205 may control the operation of such switches to charge one or more undercharged battery modules 220 while bypassing one or more overcharged battery modules 220 or discharge one or more overcharged battery modules 220 while bypassing one or more undercharged battery modules 220, or to disable or isolate one or more defective or at-risk (e.g., overheated) battery modules 220, among other possibilities. Additionally or alternatively, a PE-based BMS 205 may provide circuit protection or other forms of protection for the battery string 215 as a whole. For example, a PE-based BMS 205 may control the operation of the power converter 210 or one or more other switching components within the corresponding battery string 215 or the battery system to isolate the battery string 215 (e.g., if the battery string 215 becomes defective or at-risk of becoming overcharged or otherwise damaged such as by an excessive input or output current or excessive string voltage, or based on signaling from the EMS 240).

Along with providing one or more battery management functions for a corresponding battery string 215, a PE-based BMS 205 may monitor, control, or both one or more aspects of the operation of the power converter 210 for the corresponding battery string 215. For example, a PE-based BMS 205 may monitor or control the operation of one or more aspects of the power electronics circuitry within the corresponding power converter 210. As one such example, a PE-based BMS 205 may monitor or control the operation of one or more switches (e.g., power switches) within the corresponding power converter 210, such as the duty cycle of one more switches, to achieve conversion between the string voltage (which may be an input or output voltage of the power converter 210) and some other voltage (which may correspondingly be another output or input voltage of the power converter 210). For example, the PE-based BMS 205 may monitor or control the operation of one or more switches in accordance with a pulse-width modulation algorithm to achieve conversion between the string voltage and the other voltage. In some cases, the PE-based BMS 205 may monitor and receive information from one or more sensors associated with the power converter 210 or the corresponding battery string 215, such as information regarding the string voltage or string current (e.g., current into or out of the string) or a target string voltage or string current, or information regarding the other input or output voltage or current of the power converter 210 or a target value thereof. The PE-based BMS 205 may control the operation of one or more aspects of the power converter 210 (e.g., one or more switches thereof) based on such information.

In some cases, the PE-based BMS 205 may comprise a single controller (e.g., fabricated on a single semiconductor die). In other cases, the PE-based BMS 205 may comprise two or more controllers (e.g., fabricated on two or more semiconductor dies) that are communicatively coupled with one another. For example, one or more controllers may control operation of the power converter 210, and one or more other controllers may provide battery management functionalities as ascribed herein to a PE-based BMS, and such controllers may exchange information to coordinate such functionalities (e.g., manage the operation of the battery modules 220 of the battery string 215 based on operational information for the power converter 210, or manage operation of the power converter 210 based on operational information for the battery string 215 or battery modules 220 therein).

Figure 3:
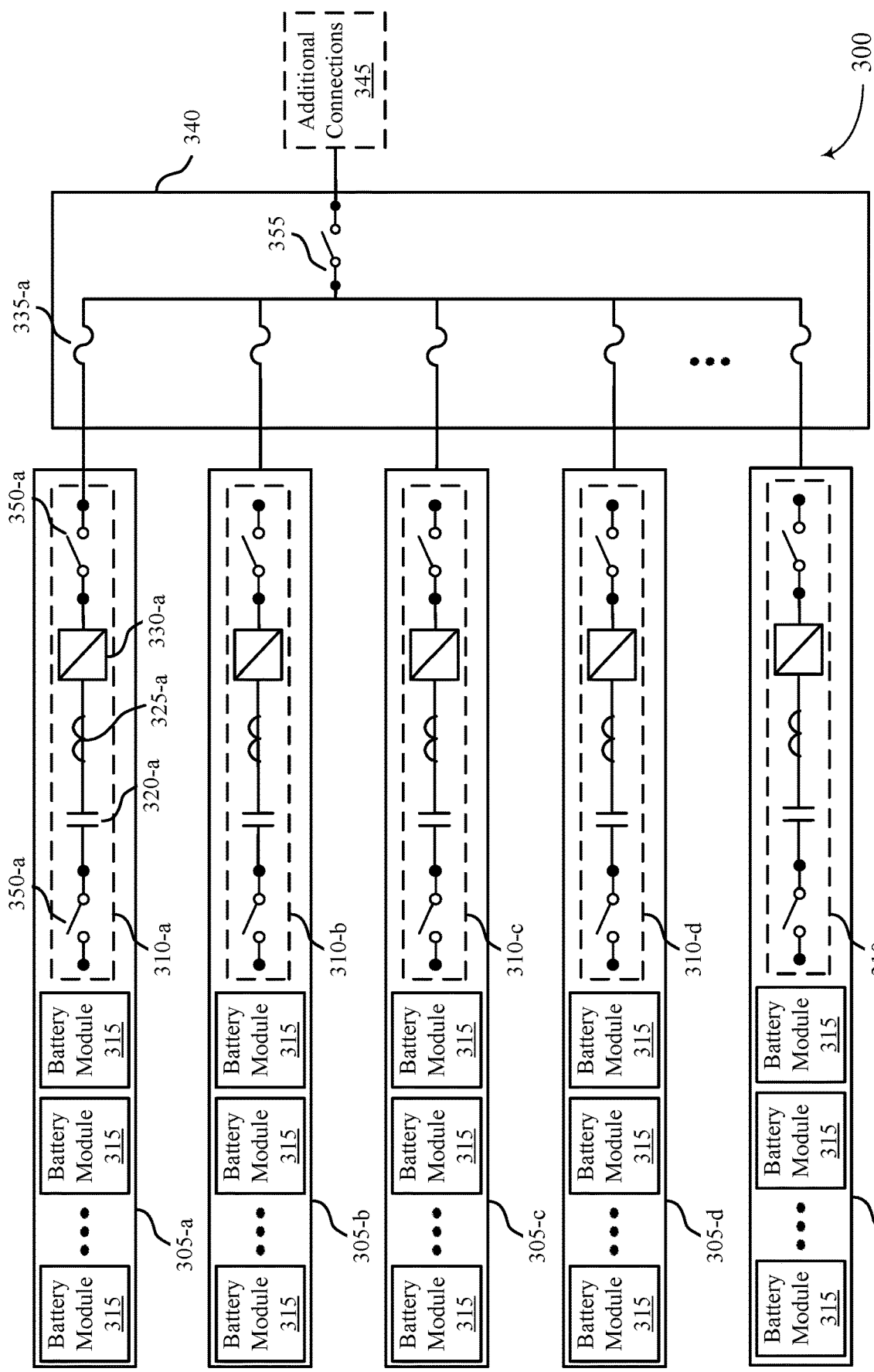
FIG. 3 illustrates an example of aspects of a battery energy storage system in accordance with aspects of the present disclosure.

FIG. 3 illustrates an example of aspects of a BESS 300 in accordance with aspects of the present disclosure. In some cases, the BESS 300 may include or be included in aspects of the BESS 200 described with reference to FIG. 2. For example, FIG. 2 may illustrate communicative connections between one or more components of a BESS in accordance with aspects of the present disclosure, while FIG. 3 may illustrate electrical connections between one or more components of the BESS.

BESS 300 may include a set of battery strings 305 and respective sets of battery modules 315, which may be examples of battery strings 215 and battery modules 220 as described with reference to FIG. 2. Each battery string 305 may also include a PE-based BMS 310, which may be an example of PE-based BMS 205 as described with respect to FIG. 2. The set of battery strings 305 and corresponding PE-based BMSs 310 may be connected to additional connections 345. Example options for additional connections 345 may be further described elsewhere herein, including with respect to FIG. 4.

PE-based BMSs 310 and battery strings 305 may be connected to the additional connections 345 via a battery combiner box 340. Battery combiner box 340 may include switch 355, which may be operable to selectively connect the battery combiner box 340 to or disconnect the battery combiner box from the additional connections 345. Additionally or alternatively, the battery combiner box 340 may include one or more other circuit protection components 335 (e.g., circuit breakers, fuses, current transducers, or the like). For example, battery string 305-*a* and PE-based BMS 310-*a* may be connected to circuit protection component 335-*a*. The battery combiner box 340 may include a common node to which each of the battery strings 305 may be coupled (e.g., through the circuit protection components 335), such as the node of the BESS 300 between the circuit protection components 335 and the switch 355. Current may flow into or out of the battery strings 305 through the battery combiner box 340. In some cases, the battery strings 305 and battery combiner box 340 of the BESS 300 may all be included in a battery system as described herein. In other cases, the battery combiner box 340 may be outside of a battery system as described herein, and the battery strings 305 may be distributed across any quantity (e.g., one or more) of battery systems as described herein.

The PE-based BMSs 310 may each include a respective set of components to perform the functions ascribed herein to a PE-based BMS. For example, each PE-based BMS 310 may include one or more switches 350 (e.g., isolation switches), contactors 320, power converters 330, and current transducers 325, along with one or more controllers that may control the operation of such components. A power converter 330 may be an example of a power converter 210 as described with reference to FIG. 2. Current transducers 325 may in some cases comprise shunt resistors, such as high-accuracy shunt resistors.

A PE-based BMS 310 thus may integrate one or more circuit protection components (e.g., switches 350-*a* and 350-*b*, current transducers 325, or other overcurrent or overvoltage protection devices, which may eliminate the inclusion of a switchgear for each battery string 305. Additionally or alternatively, as described herein, a power converter 330 may include or otherwise provide various circuit protection functionalities, such as one or more circuit breakers, one or more current transducers, or one or more switches that may be operable to selectively isolate the corresponding battery string 305 (or at least other aspects thereof) from other aspects of the BESS 300 (e.g., from the battery combiner box 340). Thus, a PE-based BMS 310 may reduce or eliminate the presence of otherwise duplicative circuit protection components, such as switchgears. Further, the inclusion of multiple string-level power converters 330 (e.g., a power converter 330 for each battery string) may eliminate the need for one or more other more centralized power converters to which multiple of the battery strings 305 may otherwise be coupled in other systems (e.g., a more centralized power converter that may otherwise be included in the additional connections 345).

Figure 4A:
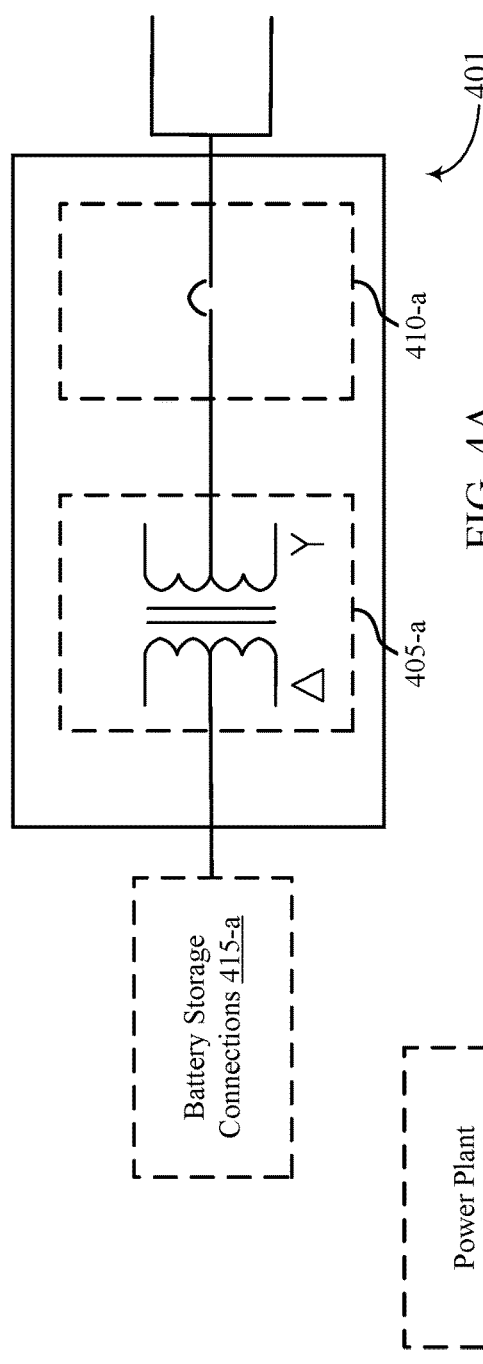
FIGS. 4A and 4B illustrate examples of systems in accordance with aspects of the present disclosure.
Figure 4B:
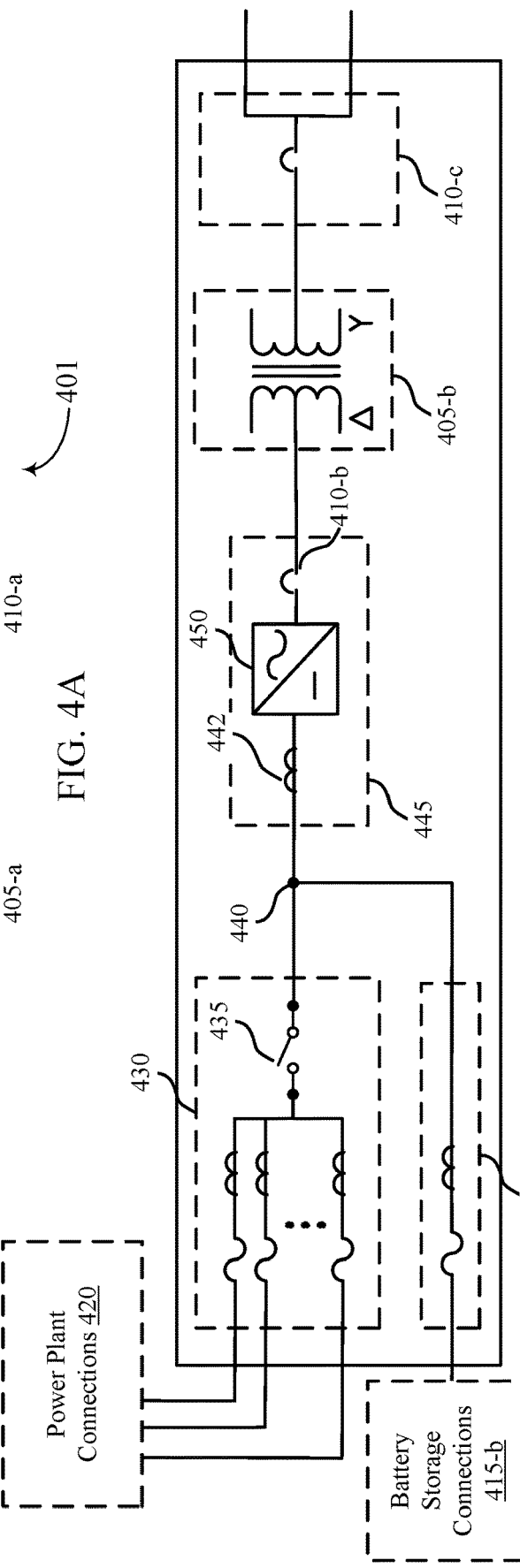

FIGS. 4A and 4B illustrate examples of systems 401 and 402 that support PE-based BMS in accordance with aspects of the present disclosure. In some examples, systems 401 and 402 may be coupled with aspects of a BESS as described herein, such as BESS 200 or BESS 300. Each system 401 and 402 may include aspects of the additional connections 345 described with respect to FIG. 3. For example, the battery storage connections 415-a of system 401 or the battery storage connections 415-b of system 402 may each include any quantity of battery combiner boxes 340 as shown in FIG. 3 (e.g., the additional connections 345 of BESS 300 may include either the battery storage connections 415-a of system 401 or the battery storage connections 415-b of system 402).

Referring to FIG. 4A, system 401 may include a transformer 405-a and circuit breaker 410-a. Battery storage connections 415-a may output or take as an input a first AC voltage. For example, battery storage connections 415-a may represent or be coupled with any quantity of battery combiner boxes 340 as described herein, which may in turn be coupled with power converters 330 that are DC-to-AC converters and convert between corresponding DC string voltages and the first AC voltage. Transformer 405-a may convert between the first AC voltage and a second AC voltage for connection to another component. For example, transformer 405-a may transform the first AC voltage to a higher or otherwise different AC voltage in order to connect a BESS (by way of battery storage connections 415-a) to an electrical power grid or other AC load or source.

Referring to FIG. 4B, system 402 may be an example of a system that connects battery storage to a grid, and also connects energy production to battery storage. Battery storage connections 415-b may represent or be coupled with any quantity of battery combiner boxes 340 as described herein, which may in turn be coupled with power converters 330 that are DC-to-DC converters and convert between corresponding DC string voltages and some other DC voltage. Power plant connections 420 may represent the output of a power plant, such as a photovoltaic power plant (e.g., solar farm). Battery storage connections 415-b may be connected to a first circuit protection box 425, which may include one or more circuit protection components (e.g., circuit breakers, fuses, current transducers, or the like). Power plant connections 420 may connect to a second circuit protection box 430, which may include one or more circuit protection components (e.g., circuit breakers, fuses, current transducers, or the like). Second circuit protection box 430 may further include or alternatively be coupled with a switch 435, which may be operable to selectively couple or decouple power plant connections 420 (and thus the associated power plant) from node 440 (and thus from battery storage connections 415-b and the associated BESS, and also thus from power conversion box 445).

Power conversion box 445 may include one or more circuit protection components, such as current transducer 442 and circuit breaker 410-b, along with a power converter 450. The power converter 450 may be a DC-to-AC converter and may convert (e.g., bidirectionally) between a DC voltage at node 440 (which may be supplied by the power plant connections 420 or the battery storage connections 415-b, or which may be supplied to the battery storage connections 415-b) and a first AC voltage input to or output by the transformer 405-b. Transformer 405-a may convert between the first AC voltage and a second AC voltage, which may be supplied to or provided by an electrical power grid or other AC load or source.

While FIGS. 4A and 4B illustrate example topologies for connecting a BESS as described herein with a one or more other power sources or loads, one of ordinary skill in the art will appreciate that other topologies may be used in conjunction with a BESS as described herein and further that aspects of the example topologies of FIGS. 4A and 4B may be combined.

Figure 5:
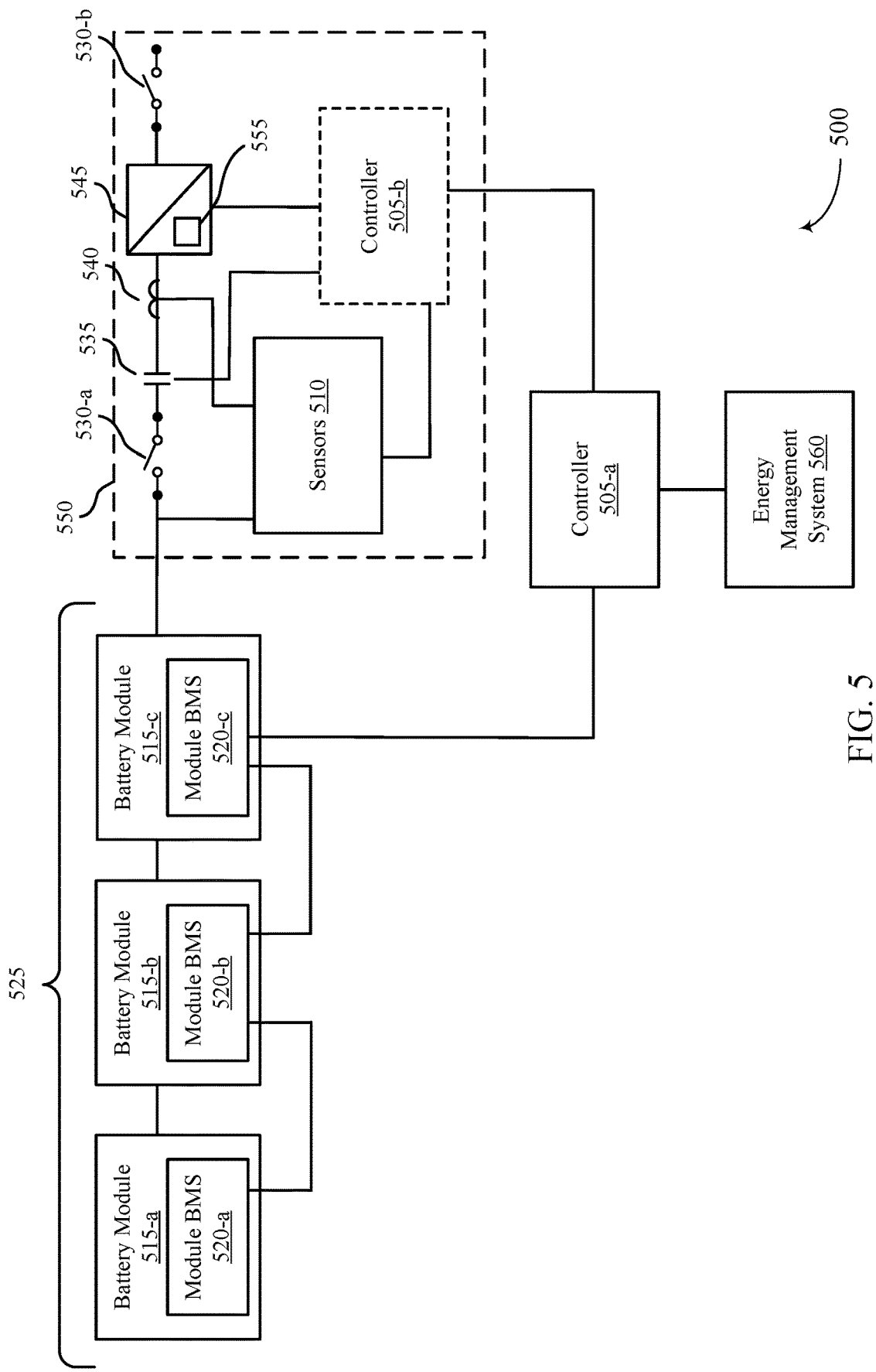
FIG. 5 illustrates an example of aspects of a battery energy storage system in accordance with aspects of the present disclosure.

FIG. 5 illustrates an example of aspects of a BESS 500 in accordance with aspects of the present disclosure. In some examples, BESS 500 may include or be included in aspects of BESS 200 or BESS 300 as described herein. BESS 500 may include battery modules 515, which may be examples of battery modules 220 and 315 as described herein. Battery modules 515 may include or otherwise be coupled with respective module BMSs 520, which may be example of module BMSs 225 as described herein. The modules 515 illustrated in FIG. 5 may be interconnected as part of a battery string 525, which may be an example of a battery string 115 or 215 as described herein.

The battery string 525 may be coupled with circuitry 550. Circuitry 550 may include, for example, a switch 530-a (e.g., an isolation switch) in series with a contactor 535, a current transducer 540, a power converter 545, and an additional switch 530-b (e.g., an isolation switch). The power converter 545 may be an example of a power converter 210 as described herein and may, for example, be a DC-to-DC or DC-to-AC converter and a unidirectional or bidirectional power converter. In some cases, the power converter 545 may be a switch mode power converter and may include one or more switches 555.

Circuitry 550 may further include one or more sensors 510. Sensors 510 may monitor one or more operational characteristics of the power converter 545 or other aspects of circuitry 550 and output indications thereof. For example, sensors 510 may include one or more voltage sensors and may monitor an input voltage of the power converter 545, an output voltage of the power converter 545, or both, either of which may correspond to a string voltage of the battery string 525 in some cases. As another example, sensors 510 may include one or more current sensors and may monitor an input or output current of the power converter 545, or both, either of which may correspond to an input or output current of the battery string 525 in some cases. In some cases, current transducer 540 may be included in or coupled with sensors 510, and current transducer 540 may generate a signal indicative of the input or output current of the power converter 545.

The BESS 500 may include one or more controllers 505, which may implement the functions ascribed herein to a PE-based BMS as described herein. For example, the module BMSs 520 of the battery string 525 may be communicatively coupled with controller 505-a. Controller 505-a may implement one or more battery management functions ascribed herein to a PE-based BMS based on information exchanged with the module BMSs 520. For example, controller 505-a may receive and monitor information regarding the battery modules 515 (e.g., voltage, current, state of charge, capacity, headroom, state of health, or temperature information for the battery modules 515 or the battery cells therein) from the module BMSs 520. Additionally or alternatively, controller 505-a may receive and monitor information for the battery string 525 as a whole (e.g., voltage, current, state of charge, capacity, headroom, state of health, or temperature information for the battery string 525). Controller 505-a may transmit one or more aspects of string-level, module-level, or cell-level information (e.g. status information) as described herein to the EMS 560, which may be an example of an EMS 240 as described herein. Controller 505-a may receive information from the EMS 560 and transmit information or commands to the module BMSs 520 of the corresponding battery string 525.

In some cases, controller 505-a may control one or more operational aspects of the circuitry 550 as described herein with reference to a PE-based BMS (e.g., with reference to a PE-based BMS 205), including the power converter 545, one or more circuit protection components (e.g., switches 530), and sensors 510. For example, controller 505-a may receive voltage information, current information, or other information from sensors 510 and control one or more operational aspects of the circuitry 550 and the power converter 545 based upon such information. In some cases, functions ascribed herein to a PE-based BMS may be performed by two or more controllers that may be communicatively coupled and exchange information and commands with one another. For example, BESS 500 may include controller 505-b, which may be communicatively coupled and exchange information and commands with controller 505-a. For example, controller 505-b may receive voltage information, current information, or other information from sensors 510 and control one or more operational aspects of the circuitry 550 and the power converter 545 based upon such information, and controller 505-b may provide related status or other information to controller 505-a, which may manage battery string 525 based upon such information as received from controller 505-b. In some cases, controller 505-a may transmit one or more aspects of status information regarding the power converter 545 or other aspects of the circuitry 550 to the EMS 560.

The inclusion in BESS 500 of a PE-based BMS that includes one or more controllers 505 and power converter 545 may replace the use of separate string level and system level BMSs, circuit protection components such as switchgears, a more centralized power converter responsible for converting the string voltages of multiple battery strings, or any combination thereof that may be present in other systems. This may provide reliability, simplicity, efficiency, and other benefits as may be appreciated by one of ordinary skill in the art.

Figure 6:
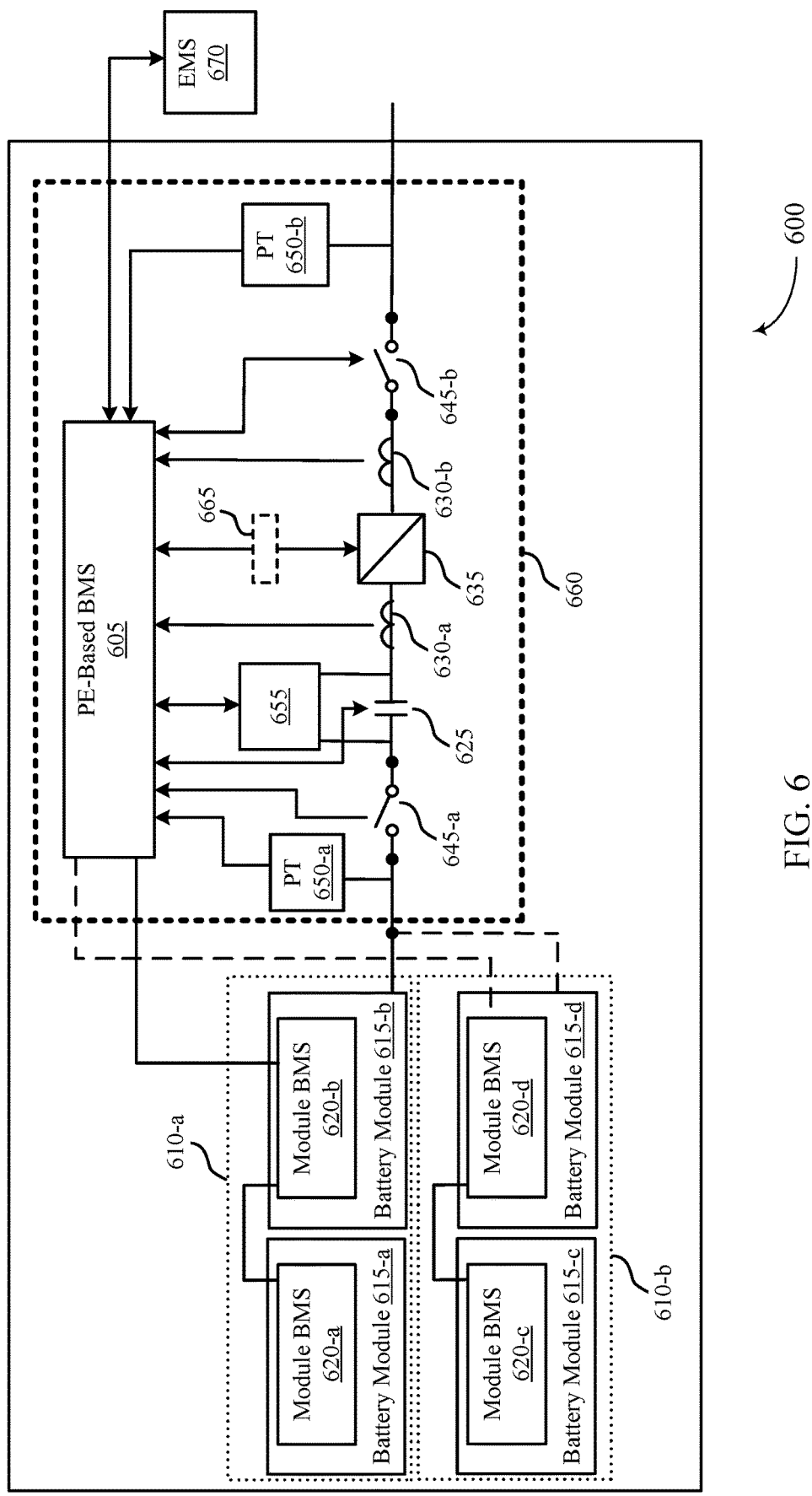
FIG. 6 illustrates an example of a system in accordance with aspects of the present disclosure.

FIG. 6 illustrates an examples of aspects of system 600 in accordance with aspects of the present disclosure. In some examples, system 600 may include or be included in aspects of BESS 200, BESS 300, or BESS 500.

System 600 may represent an example of a topology in which one PE-based BMS 605 corresponds to one or more battery strings 610. In some cases, the one PE-based BMS 605 may corresponds to one battery string 610-a. In other cases, the one PE-based BMS 605 may correspond to two battery strings 610-a and 610-b. Each battery string 610 may be an example of a battery string 215 as described herein and may include any quantity of battery modules 615 and corresponding module BMSs 620, which may be examples of battery modules 220 module BMSs 225 as described herein. PE-based BMS 605 may be an example of a PE-based BMS as described elsewhere herein and may perform battery management functions for the battery string 610-a or for battery strings 610-a and 610-b. PE-based BMS 605-a may also monitor or control power converter 635, which may be an example of a power converter 210 as described herein. PE-based BMS 605 may also monitor or control one or more other circuit protection components and sensors, such as switches 645, contactor 625, potential transducers (PTs) 650, and current transducers (CTs) 630. In some cases, PE-based BMS 605, power converter 635, and such circuit protection components and sensors may be included in a PE-Based BMS unit 660.

PTs 650 may be examples of voltage sensors. PT 650-a may measure a first voltage, which may be an input or output voltage for power converter 635 (e.g., a voltage before or after voltage conversion by power converter 635). The first voltage may be a DC voltage at which the one or more battery strings 610 receive or output power. PT 650-a may indicate the measured first voltage to PE-based BMS 605. PT 650-b may measure a second voltage, which may be a corresponding output or input voltage for power converter 635 (e.g., a voltage after or before conversion by power converter 635). The second voltage may be a DC or AC voltage at which the power converter 635 receives or outputs power. PT 650-b may indicate the measured second voltage to PE-based BMS 605.

CTs 630 may be examples of current sensors. CT 630-a may measure a first current, which may be an input or output current for power converter 635 (e.g., a current before or after voltage conversion by power converter 635). The first current may correspondingly be an output or input current for the one or more battery strings 610 and may be a DC current. CT 630-a may indicate the measured first voltage to PE-based BMS 605. CT 630-b may measure a second current, which may be a corresponding output or input current for power converter 635 (e.g., a current after or before conversion by power converter 635) and may be a DC or AC current. CT 630-b may indicate the measured second current to PE-based BMS 605. PE-Based BMS 605 may monitor operational aspects of the one or more battery strings 610 and power converter 635 based on the voltage and current information received by PE-Based BMS 605 from the PTs 650 and CTs 630, including making related energy and power determinations.

Switches 645 may be examples of any component operable to selectively couple or electrically isolate two or more nodes, such as, for example, isolation switches, circuit breakers, or additional circuit protection devices (e.g., fuses), either alone or in any combination. Switch 645-a may be operable to selectively couple or decouple the one or more battery strings 610 from other aspects of the system 600 (e.g., from power converter 635) and thereby may provide circuit protection (e.g., protection from excessive voltages or currents) for the one or more battery strings 610. Switch 645-b may be operable to selectively couple or decouple power converter 635 from a source or load for the power converter 635 (not shown) and thereby may provide circuit protection for power converter 635 along with any components coupled with the other side of power converter 635 (e.g., battery strings 610). PE-based BMS 605 may control whether switches 645 are closed or open (e.g., whether two or more nodes coupled with a switch 645 are coupled with each other or electrically isolated from each other). For example, PE-based BMS 605 may control whether switches 645 are closed or open based on information from one or more PTs 650, one or more CTs 630, or any combination thereof (e.g., PE-based BMS 605 may open a switch 645 if a sensed voltage or current exceeds a corresponding threshold). In some cases, a switch 645 may transmit feedback signaling to PE-based BMS 605, including to indicate a state of the switch 645—e.g., whether the switch 645 is on or off (open or closed) or faulted.

Power converter 635 may an example of a power converter 210 as described herein and may include one or more switches (e.g., semiconductor switches, such as MOSFETs, bipolar junction transistors (BJTs), or any other type of semiconductor switch). In some examples, PE-Based BMS 605 may directly control the operation of one or more switches within power converter 635. For example, PE-Based BMS 605 may send control signals to power converter 635 to activate or deactivate one or more individual switches therein, to implement a related pulse-width modulation algorithm, control a duty cycle for the one or more switches, or otherwise cause the one or more switches to operate so as to achieve a desired performance of the power converter 635 (e.g., a desired magnitude or phase of an output voltage, a desired magnitude or phase of an output current, a desired magnitude or angle of an output power, or the like). In other examples, PE-Based BMS 605 may send signals to supplemental controller 665 indicating one or more such desired performance metrics for the power converter 635, and supplemental controller 665 may directly control the operation of one or more switches within power converter 635 (e.g., may implement a pulse-width modulation algorithm, may achieve a target duty cycle, or any combination thereof) in order to achieve the performance requested by PE-Based BMS 605. Supplemental controller 665 may be anywhere communicatively between PE-Based BMS 605 and the one or more switches of power converter 635 and, though illustrated in the example of FIG. 6 as separate from PE-Based BMS 605 and power converter 635, may in other examples be included within (e.g., integrated into) PE-Based BMS 605 or power converter 635. In some cases, PE-Based BMS 605 may be an example of a controller 505-*a*, and supplemental controller 665 may be an example of a controller 505-*b* as described with reference to FIG. 5. Power converter 635 (and, if present, supplemental controller 665 may communicate status information for the power converter 635 (and, if present, supplemental controller 665) back to PE-based BMS 605.

PE-based BMS 605 may also control (e.g., send control signals to) and receive status or other feedback information from conditioning circuit 655. As part of initiating system 600, conditioning circuit 655 may be configured to precharge one or more other components of the system 600 (e.g., power converter 635, switches 645) to be at voltage levels within ranges or otherwise at levels suitable for such components to begin normal operation. Such precharging may, for example, avoid inrush currents or other phenomena that could cause damage to various components of system 600 by adjusting related voltages to be at suitable levels in a controlled fashion (e.g., relatively gradually). PE-based BMS 605 may cause (e.g., instruct, command) conditioning circuit 655 to precharge one or more other components of system 600 and may receive status information from conditioning circuit 655 indicating whether such components have been successfully precharged. PE-based BMS 605 may also control whether contactor 625 is open or closed, and in some cases PE-based BMS 605 may send a signal to close contactor 625 may based on an indication from conditioning circuit 655 indicating that one or more other components of the system 600 (e.g., power converter 635) have been successfully precharged. PE-based BMS 605 may in some cases also receive status information from contactor 625 (e.g., indicating whether contactor 625 is open or closed).

PE-Based BMS 605 may control any of the one or more battery strings 610, power converter 635, switches 645, and contactor 625 based on commands from EMS 670 and may send to EMS 670 status information for any component from which PE-Based BMS 605 receives status information. In some cases, for example, EMS 670 may send a charge command to PE-Based BMS 605, which may indicate a power level and duration for charging the one or more battery strings 610, and PE-Based BMS 605 may control the one or more battery strings 610, power converter 635, switches 645, contactor 625, or any combination to charge the one or more battery strings 610 in accordance with the charge command. Similarly, as another example, EMS 670 may send a discharge command to PE-Based BMS 605, which may indicate a power level and duration for discharging the one or more battery strings 610, and PE-Based BMS 605 may control the one or more battery strings 610, power converter 635, switches 645, contactor 625, or any combination to discharge the one or more battery strings 610 (e.g., to output power from the one or more battery strings 610) in accordance with the discharge command.

Other examples of commands or other information that may be received by a PE-Based BMS 605 from the EMS 670 may include reactive power set points for power converter 635, on/off commands for the PE-Based BMS 605 or any component controlled by PE-Based BMS 605, an emergency shutoff command for a battery string 610 controlled by PE-Based BMS 605, voltage or frequency ride through set points for a power source or load for power converter 635, a ramp rate set point for power converter 635, or a battery pre-charge command for a battery string 610, or any combination thereof.

In some cases, examples of information that a PE-Based BMS 605 may send to EMS 670 may include status information for a battery string 610, power converter 635, or component thereof, such as input or output voltages, currents, or power levels for power converter 635; voltage, current, temperature, state of charge, or state of health information for a battery string 610, battery module 615, or battery cell; status information for one or more circuit protection devices such as switches 645 or contactor 625; or fault information for the PE-based BMS 605 or any component controlled by PE-based BMS 605; or any combination thereof. Additionally or alternatively, in some cases, EMS 670 and PE-Based BMS 605 may exchange signaling related to a firmware update or diagnostic procedure for PE-Based BMS 605 or any component controlled by PE-based BMS 605.

It is to be understood that any BESS described herein may be adapted to include a topology such as shown in FIG. 6.

Figure 7:
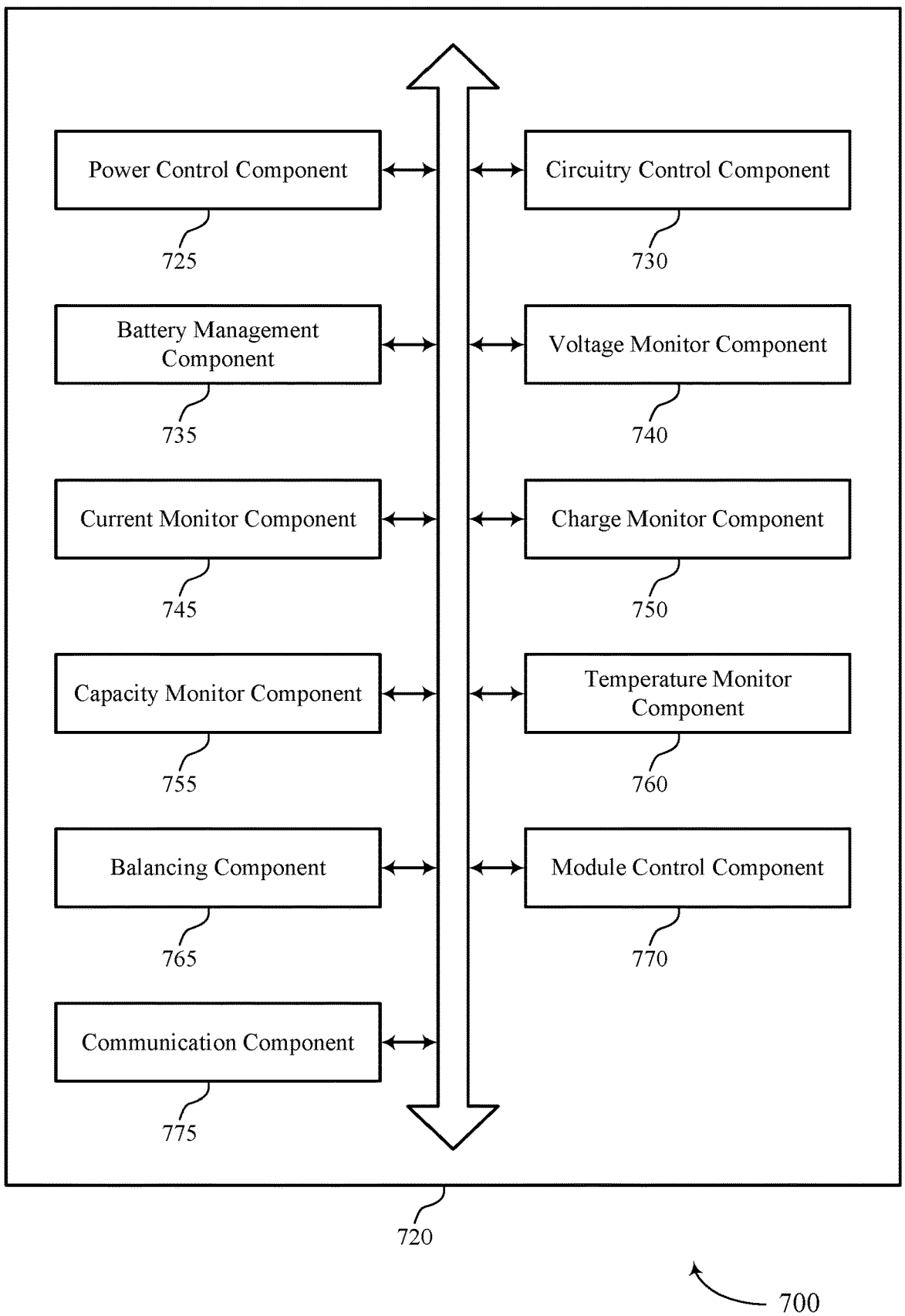
FIG. 7 shows a block diagram of a controller in accordance with aspects of the present disclosure.

FIG. 7 shows a block diagram 700 of a controller 720 that supports power electronics based battery management system in accordance with aspects of the present disclosure. The controller 720, or various components thereof, may be an example of a PE-based BMS or other means for performing various aspects of PE-based battery management as described herein. For example, the controller 720 may include a power control component 725, a circuitry control component 730, a battery management component 735, a voltage monitor component 740, a current monitor component 745, a charge monitor component 750, a capacity monitor component 755, a temperature monitor component 760, a balancing component 765, a module control component 770, a communication component 775, or any combination thereof. Each of these components may communicate, directly or indirectly, with one another (e.g., via one or more buses).

The power control component 725 may be configured as or otherwise support a means for controlling a power converter, the power converter configured to convert between a first voltage and a second voltage different than the first voltage. The battery management component 735 may be configured as or otherwise support a means for exchanging signaling with each battery module of a set of battery modules, wherein the set of battery modules is configured to receive power from or output power to the power converter. The battery management component 735 may be configured as or otherwise support a means for implementing a set of battery management functions for the set of battery modules based at least in part on exchanging the signaling with each battery module of the set of battery modules. In some examples, the controller may be implemented on a single semiconductor die. In some examples, the controller may be implemented on a plurality of semiconductor dies.

In some examples, to control the power converter, the power control component 725 may be configured as or otherwise support a means for selectively activating and deactivating one or more switches of the power converter, selectively the. In some examples, based at least in part on selectively activating and deactivating at least one switch of the one or more switches of the power converter, the power control component 725 may be configured as or otherwise support a means for controlling a duty cycle of the at least one switch. In some examples, based at least in part on selectively activating and deactivating at least one switch of the one or more switches of the power converter, the power control component 725 may be configured as or otherwise support a means for operating the at least one switch according to a pulse-width modulation algorithm.

In some examples, the current monitor component 745 may be configured as or otherwise support a means for receiving signaling indicating a magnitude of an input current for the power converter, signaling indicating a magnitude of an output current for the power converter, or both, and the power control component 725 may be configured as or otherwise support a means for controlling the power converter based at least in part on the receiving the signaling indicating the magnitude of the input current for the power converter, the signaling indicating the magnitude of the output current for the power converter, or both.

In some examples, the voltage monitor component 740 may be configured as or otherwise support a means for receiving signaling indicating a magnitude of an input voltage for the power converter, signaling indicating a magnitude of an output voltage for the power converter, or both, and the power control component 725 may be configured as or otherwise support a means for controlling the power converter based at least in part on the receiving the signaling indicating the magnitude of the input voltage for the power converter, the signaling indicating the magnitude of the output voltage for the power converter, or both.

In some examples, the circuitry control component 730 may be configured as or otherwise support a means for selectively activating and deactivating a first switch configured to selectively couple a first node of the power converter with the set of battery modules, and selectively activating and deactivating a second switch configured to selectively couple a second node the power converter with a load or power source.

In some examples, the circuitry control component 730 may be configured as or otherwise support a means for controlling a contactor configured to selectively couple a first node of the power converter with the set of battery modules.

In some examples, the circuitry control component 730 may be configured as or otherwise support a means for controlling a conditioning circuit to precharge an input voltage the power converter, an output voltage of the power converter, or both, coupling a first node of the power converter with the set of battery modules after precharging the input voltage the power converter, the output voltage of the power converter, or both, and coupling a second node of the power converter with a load or power source after precharging the input voltage the power converter, the output voltage of the power converter, or both.

In some examples, the power control component 725 may be configured as or otherwise support a means for monitoring one or more operating characteristics of the power converter, and control the power converter based at least in part on the monitoring.

In some examples, to implement the set of battery management functions for the set of battery modules, voltage monitor component 740 may be configured as or otherwise support a means for monitoring a voltage output by each battery module of the set of battery modules. In some examples, to implement the set of battery management functions for the set of battery modules, current monitor component 745 may be configured as or otherwise support a means for monitoring a current output by each battery module of the set of battery modules. In some examples, to implement the set of battery management functions for the set of battery modules, charge monitor component 750 may be configured as or otherwise support a means for monitoring an extent of charge for each battery module of the set of battery modules. In some examples, to implement the set of battery management functions for the set of battery modules, capacity monitor component 755 may be configured as or otherwise support a means for monitoring a capacity of each battery module of the set of battery modules. In some examples, to implement the set of battery management functions for the set of battery modules, temperature monitor component 760 may be configured as or otherwise support a means for monitoring a temperature of the set of battery modules. In some examples, to implement the set of battery management functions for the set of battery modules, balancing component 765 may be configured as or otherwise support a means for balancing respective voltages, respective currents, or any combination thereof across a plurality of battery modules within the set of battery modules. In some examples, to implement the set of battery management functions for the set of battery modules, module control component 770 may be configured as or otherwise support a means for selectively enabling or disabling a battery module of the set of battery modules.

In some examples, communication component 775 may be configured as or otherwise support a means for communicating status information for the set of battery modules with an energy management system. In some examples, power control component 725 may be configured as or otherwise support a means for controlling the power converter based at least in part on signaling received from the energy management system. In some examples, battery management component 735 may be configured as or otherwise support a means for controlling the set of battery modules based at least in part on signaling received from the energy management system.

Figure 8:
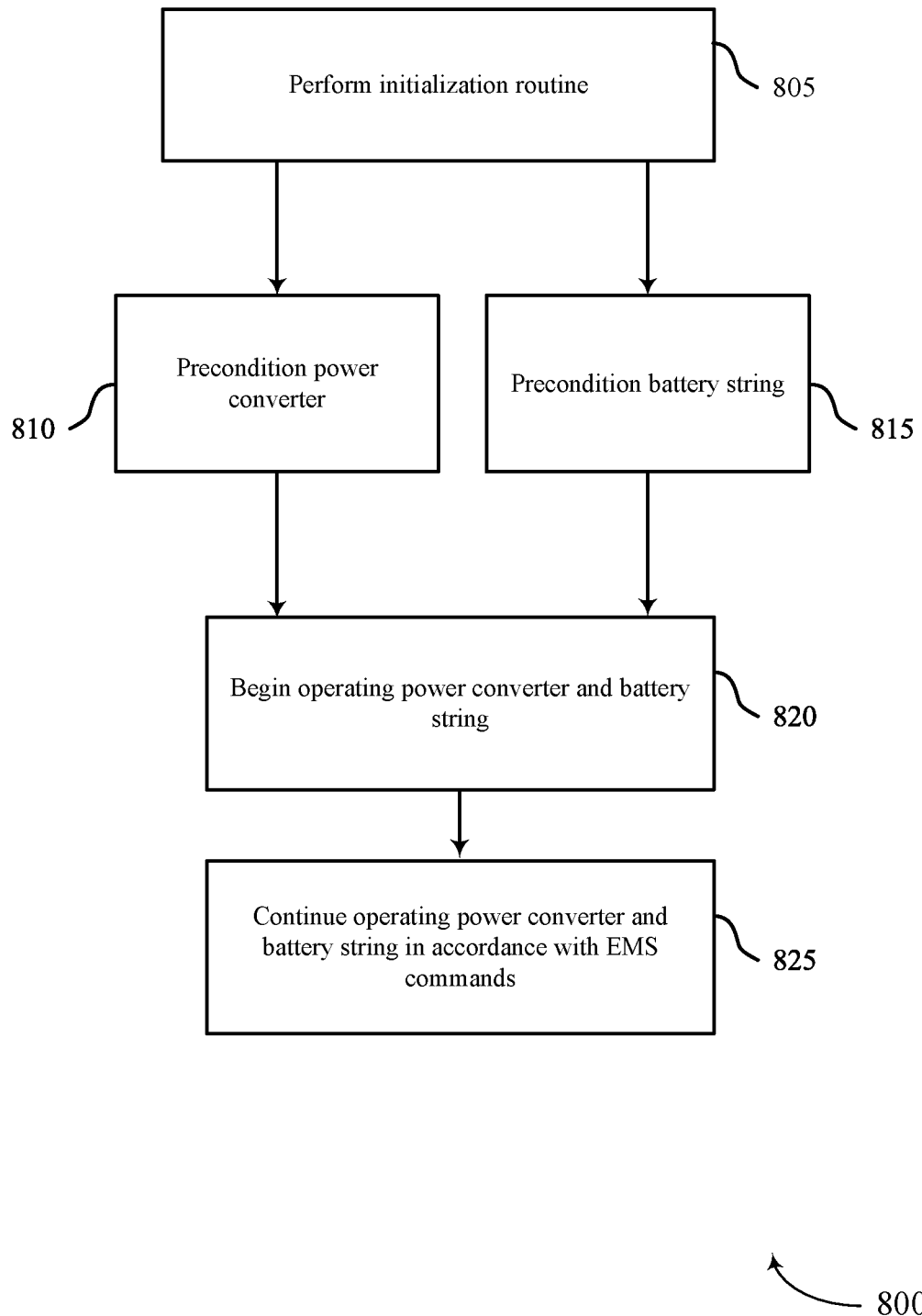
FIG. 8 shows a flowchart illustrating methods in accordance with aspects of the present disclosure.

FIG. 8 shows a flowchart illustrating a method 800 in accordance with various aspects of the present disclosure. The operations of the method 800 may be implemented by a PE-based BMS or its components as described herein. For example, the operations of the method 800 may be performed by a PE-based BMS as described with reference to FIGS. 2 through 6. In some examples, a PE-based BMS may execute a set of instructions (e.g., firmware or software as may be stored on one or more computer-readable media) to perform the described functions. Additionally or alternatively, the PE-based BMS may perform aspects of the described functions using special-purpose hardware.

At 805, the method may include performing an initialization routine. For example, as part of performing the initialization routine, the PE-based BMS may establish and verify communications with an EMS and any quantity of module BMSs included in a battery string controlled by the PE-based BMS. As another example, as part of performing the initialization routine, the PE-based BMS may send initialization signals to one or more other components coupled with the PE-based BMS (e.g., battery strings or components thereof, a power converter, switches or other circuit protection components), which may cause the one or more other components to each perform a respective initialization routine. Additionally or alternatively, example, as part of performing the initialization routine, the PE-based BMS may check the status (e.g., state of health) of any components coupled with the PE-based BMS to verity that the component is in a suitable condition to begin operating.

At 810, which in some cases may occur after performing the initialization routine at 805, the PE-based BMS may precondition a power converter controlled by the PE-based BMS. For example, the PE-based BMS may configure one or more operating parameters for the power converter (e.g., voltage, current, or power set points). As another example, the PE-based BMS may cause a conditioning circuit such as conditioning circuit 655 described with reference to FIG. 6 to precharge the power converter or one or more other components coupled with the power converter. Based on preconditioning the power converter, for example, the PE-based BMS may ensure one or more voltages associated with the power converter (e.g., voltages at input or output nodes of the power converter) are within ranges such that the power converter can safely being operating.

At 815, which in some cases may occur after performing the initialization routine at 805, the PE-based BMS may precondition a battery string (e.g., one battery string or two battery strings) controlled by the PE-based BMS. In some cases, preconditioning a battery string at 815 may occur at least partially concurrently with preconditioning a power converter at 810. As one example, preconditioning a battery string may include obtaining state of charge, temperature, voltage, state of health, or other status information for the battery modules within the battery string, balancing the battery modules within the battery string, or any combination thereof. Based on preconditioning the battery string, for example, the PE-based BMS may ensure the battery string is in a condition to begin discharging or charging.

At 820, which in some cases may occur after one or more operations described with reference to 810 or 815, the PE-based BMS may begin operating the power converter and battery string. For example, the PE-based BMS may close a contactor and begin operating one or more switches of the power converter as described herein (e.g., either directly or by way of a supplemental controller 665 as described with reference to FIG. 6), so that power may flow through the power converter to charge or discharge a battery string, and so that the power converter may convert between an input voltage and an output voltage.

At 825, which in some cases may occur after beginning to operate the power converter at 820, the PE-based BMS may continue operating the power converter and battery string in accordance with commands (e.g., charge or discharge commands) that may be received from an EMS. The PE-based BMS may also exchange any other signaling (e.g., send any status information) to the EMS as described herein.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed by a controller, which may for example and without limitation refer to a processor, a microprocessor, a microcontroller, a DSP, an ASIC, a CPU, an FPGA or other programmable logic device, discrete gate or transistor logic, discrete hardware components, or any combination thereof designed to perform one or more of the related functions described herein. A controller may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a controller, firmware executed by a controller, or any combination thereof. If implemented in software or firmware executed by a controller, the functions may be stored on or transmitted over as one or more instructions or code on a computer-readable medium. Other examples and implementations are within the scope of the disclosure and appended claims. For example, due to the nature of software, functions described herein may be implemented using software executed by a controller, hardware, firmware, hardwiring, or combinations of any of these. Features implementing functions may also be physically located at various positions, including being distributed such that portions of functions are implemented at different physical locations.

As used herein, including in the claims, "or" as used in a list of items (e.g., a list of items prefaced by a phrase such as "at least one of" or "one or more of") indicates an inclusive list such that, for example, A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:
   a controller configured to:
      control a power converter configured to convert between a first voltage and a second voltage different than the first voltage;
      exchange signaling with each module-level battery management system of a plurality of module-level battery management systems, each of the plurality of module-level battery management systems configured to implement a set of module-level battery management functions for a respective battery module of a string of battery modules, wherein the string of battery modules is configured to collectively receive power from or output power to the power converter at the first voltage; and
      implement a set of string-level battery management functions for the string of battery modules based at least in part on exchanging the signaling with each module-level battery management system of the plurality of module-level battery management systems.

2. The apparatus of claim 1, wherein, to control the power converter, the controller is configured to:
   selectively activate and deactivate one or more switches of the power converter.

3. The apparatus of claim 2, wherein, based at least in part on selectively activating and deactivating at least one switch of the one or more switches of the power converter, the controller is configured to control a duty cycle of the at least one switch.

4. The apparatus of claim 2, wherein, based at least in part on selectively activating and deactivating at least one switch of the one or more switches of the power converter, the controller is configured to operate the at least one switch according to a pulse-width modulation algorithm.

5. The apparatus of claim 1, wherein the controller is configured to:
   receive signaling indicating a magnitude of an input current for the power converter, signaling indicating a magnitude of an output current for the power converter, or both; and
   control the power converter based at least in part on the signaling indicating the magnitude of the input current for the power converter, the signaling indicating the magnitude of the output current for the power converter, or both.

6. The apparatus of claim 1, wherein the controller is configured to:
   receive signaling indicating a magnitude of an input voltage for the power converter, signaling indicating a magnitude of an output voltage for the power converter, or both; and
   control the power converter based at least in part on the signaling indicating the magnitude of the input voltage for the power converter, the signaling indicating the magnitude of the output voltage for the power converter, or both.

7. The apparatus of claim 1, wherein the controller is configured to:
   selectively activate and deactivate a first switch configured to selectively couple a first node of the power converter with the string of battery modules; and
   selectively activate and deactivate a second switch configured to selectively couple a second node the power converter with a load or power source.

8. The apparatus of claim 1, wherein the controller is configured to:
   control a contactor configured to selectively couple a first node of the power converter with the string of battery modules.

9. The apparatus of claim 1, wherein the controller is configured to:
   control a conditioning circuit to precharge an input voltage the power converter, an output voltage of the power converter, or both;
   couple a first node of the power converter with the string of battery modules after precharging the input voltage the power converter, the output voltage of the power converter, or both; and
   couple a second node of the power converter with a load or power source after precharging the input voltage the power converter, the output voltage of the power converter, or both.

10. The apparatus of claim 1, wherein the controller is configured to:
    monitor one or more operating characteristics of the power converter; and
    control the power converter based at least in part on the monitoring.

11. The apparatus of claim 1, wherein, to implement the set of string-level battery management functions for the string of battery modules, the controller is configured to:
    monitor a voltage output by each battery module of the string of battery modules.

12. The apparatus of claim 1, wherein the controller is further configured to:
    communicate status information for the string of battery modules with an energy management system; and
    control the power converter and the string of battery modules based at least in part on signaling received from the energy management system.

13. The apparatus of claim 1, wherein the controller is implemented on a single semiconductor die.

14. The apparatus of claim 1, wherein the controller is implemented on a plurality of semiconductor dies.

15. The apparatus of claim 1, wherein, to implement the set of string-level battery management functions for the string of battery modules, the controller is configured to:
monitor a current output by each battery module of the string of battery modules.

16. The apparatus of claim 1, wherein, to implement the set of string-level battery management functions for the string of battery modules, the controller is configured to:
monitor an extent of charge for each battery module of the string of battery modules.

17. The apparatus of claim 1, wherein, to implement the set of string-level battery management functions for the string of battery modules, the controller is configured to:
monitor a capacity of each battery module of the string of battery modules.

18. The apparatus of claim 1, wherein, to implement the set of string-level battery management functions for the string of battery modules, the controller is configured to:
monitor a temperature of the string of battery modules.

19. The apparatus of claim 1, wherein, to implement the set of string-level battery management functions for the string of battery modules, the controller is configured to:
balance respective voltages, respective currents, or any combination thereof across a plurality of battery modules within the string of battery modules.

20. The apparatus of claim 1, wherein, to implement the set of string-level battery management functions for the string of battery modules, the controller is configured to:
selectively enable or disable a battery module of the string of battery modules.

* * * * *